(12) United States Patent
Bohmhammel et al.

(10) Patent No.: US 8,697,021 B2
(45) Date of Patent: Apr. 15, 2014

(54) METHOD FOR THE PRODUCTION OF HSICL₃ BY CATALYTIC HYDRODEHALOGENATION OF SICL₄

(75) Inventors: Klaus Bohmhammel, Freiberg (DE); Sven Koether, Freiberg (DE); Gerhard Roewer, Freiberg (DE); Ingo Roever, Freiberg (DE); Jaroslaw Monkiewicz, Rheinfelden (DE); Hans-Juergen Hoene, Bad Nauheim (DE)

(73) Assignee: Evonik Degussa GmbH, Essen (DE)

( * ) Notice: Subject to any disclaimer, the term of this patent is extended or adjusted under 35 U.S.C. 154(b) by 655 days.

(21) Appl. No.: 10/586,369

(22) PCT Filed: Mar. 10, 2005

(86) PCT No.: PCT/EP2005/051081
§ 371 (c)(1),
(2), (4) Date: Jul. 18, 2006

(87) PCT Pub. No.: WO2005/102928
PCT Pub. Date: Nov. 3, 2005

(65) Prior Publication Data
US 2007/0173671 A1    Jul. 26, 2007

(30) Foreign Application Priority Data
Apr. 23, 2004 (DE) .................. 10 2004 019 760

(51) Int. Cl.
*C01B 33/107* (2006.01)

(52) U.S. Cl.
USPC .......................................... 423/342; 423/341

(58) Field of Classification Search
USPC .................................................. 423/341, 342
See application file for complete search history.

(56) References Cited

U.S. PATENT DOCUMENTS

| | | | | |
|---|---|---|---|---|
| 3,565,590 A * | 2/1971 | Bracken | ......................... | 423/342 |
| 3,613,766 A * | 10/1971 | Holzl et al. | ..................... | 164/46 |
| 3,933,985 A * | 1/1976 | Rodgers | ......................... | 423/350 |
| 4,224,061 A * | 9/1980 | Hiraishi et al. | ................. | 420/57 |
| 4,536,642 A * | 8/1985 | Hamster et al. | ................. | 392/492 |
| 5,176,892 A * | 1/1993 | Halm et al. | ..................... | 423/342 |
| 5,716,590 A * | 2/1998 | Roewer et al. | ................. | 423/342 |
| 5,910,295 A * | 6/1999 | DeLuca | ......................... | 423/337 |
| 5,927,865 A * | 7/1999 | Ito et al. | ......................... | 384/492 |
| 6,126,796 A * | 10/2000 | Shimamune et al. | ......... | 204/263 |
| 6,197,436 B1 * | 3/2001 | Zayets et al. | .................. | 428/622 |
| 6,653,212 B1 * | 11/2003 | Yamanaka et al. | ............ | 438/485 |
| 2004/0047794 A1 * | 3/2004 | Pfaffelhuber et al. | ........ | 423/342 |
| 2008/0072818 A1 * | 3/2008 | Mostarshed et al. | ............ | 117/87 |

FOREIGN PATENT DOCUMENTS

| JP | 57118017 | 7/1982 |
|---|---|---|
| JP | 01100011 | 4/1989 |

OTHER PUBLICATIONS

Valente, Gianluca et al, "Reduced order model for the CVD of epitaxial silicon from silane and chlorosilanes", Journal of Crystal Growth 230 (2001), pp. 247-257.*
U.S. Appl. No. 12/278,522, filed Aug. 6, 2008, Fester, et al.
Griesshammer, Rudolf et al.,"Manufacture of Trichlorosilane by Reduction of Tetrachlorosilane in Fluidized Bed", Caplus, 1996. (English abstract only).
U.S. Appl. No. 10/584,466, filed Jun. 22, 2006, Bohmhammel, et al.

* cited by examiner

*Primary Examiner* — Ngoc-Yen Nguyen
(74) *Attorney, Agent, or Firm* — Oblon, Spivak, McClelland, Maier & Neustadt, L.L.P.

(57) ABSTRACT

The invention relates to a process for the catalytic hydrodehalogenation of SiCl₄ to form HSiCl₃, which comprises bringing a gaseous feed mixture comprising hydrogen and silicon tetrachloride into direct contact with at least one heating element of a resistance heating device, with the heating element being composed of a metal or a metal alloy and being heated to carry out the reaction.

26 Claims, No Drawings

METHOD FOR THE PRODUCTION OF HSICL₃ BY CATALYTIC HYDRODEHALOGENATION OF SICL₄

The invention relates to a process for the catalytic hydrodehalogenation of silicon tetrachloride ($SiCl_4$) to form trichlorosilane ($HSiCl_3$) in the presence of hydrogen.

In many industrial processes in silicon chemistry, $SiCl_4$ and $HSiCl_3$ are formed together. It is therefore necessary to convert these products into one another and thus meet the respective demand for one of the products.

In addition, high-purity $HSiCl_3$ is an important starting material in the production of solar silicon. EP 0 658 359 A2 discloses a process for the catalytic hydrodehalogenation of $SiCl_4$ to form HSiCl3 in the presence of hydrogen, in which finely divided transition metals or transition metal compounds selected from the group consisting of nickel, copper, iron, cobalt, molybdenum, palladium, platinum, rhenium, cerium and lanthanum are used as unsupported catalyst, with these being able to form suicides with elemental silicon or silicon compounds. Problems are, due to the strongly endothermic nature of the reaction, the indirect introduction of the heat of reaction and the sintering of the catalyst particles associated with a loss in activity and difficulties in regulating the degree of conversion. In addition, the separation of the used finely divided catalyst from the product mixture requires a considerable outlay.

On this subject, I. Röver et al., "The catalytic hydrogenation of chlorosilanes—the crucial print of production of electronic—grade silicon", Silicon for the Chemical Industry VI, Loen, Norway, Jun. 17-21, 2002; Eds.: M. A. Øye et al., Trondheim, Norway, 2002, page 209 ff., report that not all transition metals are able to form silicides since silicide formation in the case of these elements is at least partially kinetically inhibited.

It was thus an object of the present invention to provide a further possible way of preparing $HSiCl_3$ from $SiCl_4$.

According to the invention, this object is achieved as set forth in the claims.

Thus, it has surprisingly been found that $HSiCl_3$ can be produced in a simple, economical and effective manner by catalytic hydrodehalogenation of $SiCl_4$ in the presence of hydrogen when a gaseous feed mixture comprising hydrogen and silicon tetrachloride is brought into direct contact with at least one hot heating element of a resistance heating device, with the heating element being composed of a metal suitable for this purpose or a metal alloy.

It is particularly surprising that heating elements comprising tungsten, niobium, tantalum or corresponding alloys display catalytic activity under the present reaction conditions, although this would not have been expected because of the kinetic inhibition of silicide formation.

In addition, such heating elements have mechanical stability and the removal of finely divided catalyst dust can advantageously be dispensed with.

A further advantage is that the energy required for the present reaction can be introduced directly via the resistance heating device and energy losses due to indirect heating of the reactor can thus advantageously be avoided.

Thus, conversion into $HSiCl_3$ in the vicinity of the thermodynamic conversion can advantageously be obtained according to the invention when an $SiCl4/H_2$ mixture is passed over the heated elements of a resistance heating device. In the present process, it is also possible to obtain the product composition desired in the particular case quickly and flexibly by variation of the electric power applied to the heating elements of the resistance heating device. The energy consumption is significantly lower than in the case of conventional indirect heating since, advantageously, only the gas in the vicinity of the also catalytically active heating element rather than all the gas stream is brought to the reaction temperature.

The present invention accordingly provides a process for the catalytic hydrodehalogenation of $SiCl_4$ to form $HSiCl_3$, which comprises bringing a gaseous feed mixture comprising hydrogen and silicon tetrachloride into direct contact with at least one heating element of a resistance heating device, with the heating element being composed of a metal or a metal alloy and being heated to carry out the reaction.

In the process of the invention, use is made of, in particular, at least one heating element composed of a metal from the group consisting of niobium, tantalum and tungsten or of a metal alloy comprising niobium, tantalum and/or tungsten, in the case of which silicide formation is substantially inhibited under the reaction conditions.

Thus, the process of the invention is preferably carried out using at least one heating element which has the form of a wire, a spiral, a web, a tube, e.g. tubes which may have webs or are provided with crosses or inserts or whose walls are provided with holes, a plate, for example smooth or corrugated plates, perforated plates or plates having folds, creases or raised regions or packets of plates, a mesh, for example smooth or corrugated meshes, or a honeycomb body, for example with a round, square, triangular, hexagonal or octagonal cell cross section.

Preference is given to heating elements whose wire diameter, wall thickness or plate or layer thickness is from 0.1 mm to 10 mm, preferably from 0.3 to 8 mm, particularly preferably from 0.5 to 5 mm.

Such heating elements of a resistance heating device known per se are, in the case of the process of the invention, preferably used in a flow reactor which can be supplied with a gaseous $H_2/SiCl_4$ mixture. The heating elements described are generally commercially available and are advantageously provided with water-cooled electric power connections in a manner known per se. To carry out the process of the invention, electric power is supplied to the resistance heating device present, as a result of which the heating elements are heated and the hydrodehalogenation of $SiCl_4$ to form $HSiCl_3$ takes place according to the invention. The electric power is generally increased slowly, for example over a period of about 30 minutes, until the desired reaction temperature has been reached. To regulate and control heating, temperature measurements are preferably carried out at the heating elements, at the reactor wall and in the feed stream or product stream.

In the process of the invention, the heating elements of the resistance heating device are preferably operated at a temperature in the range from 300 to 1250° C., in particular from 700 to 950° C.

The reaction according to the invention is thus appropriately carried out at a temperature in the range from 600 to 950°0 C., in particular from 700 to 900° C., and a pressure of from 0.1 to 100 bar abs., preferably from 1 to 10 bar abs., in particular from 1.5 to 2.5 bar abs.

In the process of the invention, the reaction is preferably carried out at a space velocity (SV=volume flow/reactor volume provided with heating elements) of from 2000 to 750 000 $h^{-1}$, preferably from 5000 to 500 000 $h^{-1}$, and/or a volume flow based on catalyst surface area (AV=volume flow/catalyst surface area) of from 10 to 0.01 m/s, particularly preferably from 1 to 0.05 m/s. Furthermore, preference is given to passing the gas mixture of hydrogen and silicon tetrachloride over the heating elements of the resistance heating device at a linear velocity (LV=volume flow/cross-sectional area of reactor) of from 0.01 to 10 m/s, preferably from 0.01 to 8 m/s, particularly preferably from 0.02 to 5 m/s. The volume flows on which the reaction kinetic parameters indicated above and below are based are in each case at STP. The process parameters are advantageously set so that laminar flow occurs.

The process of the invention is carried out using a gaseous $SiCl4/H_2$ mixture which preferably has a molar $SiCl_4$:$H_2$ ratio of from 1:0.9 to 1:20, particularly preferably from 1:1 to 1:10, very particularly preferably from 1:1.5 to 1:8, in particular from 1:2 to 1:4.

In general, the $SiCl_4$ is, if necessary, brought into the gas phase and a defined amount of hydrogen gas is metered into it. Here, traces of water and oxygen, in particular, have to be excluded. It is advantageous to use pure to very pure $SiCl_4$ and hydrogen.

The desired degree of conversion [conv.=100%.c($HSiCl_3$)/$c_0$ ($SiCl_4$)] can advantageously be regulated or set in the process of the invention by setting the electric power of the resistance heating device without interruption of the process becoming necessary.

Furthermore, the reaction according to the invention is appropriately carried out in a flow reactor whose walls or wall insides are composed of niobium, tungsten, tantalum, a niobium-, tungsten- and/or tantalum-containing alloy, a heat-resistant glass, in particular fused silica, a heat-resistant glaze or a heat-resistant ceramic or specialty ceramic.

The product mixture or product gas stream obtained in the process of the invention can advantageously be passed through at least one heat exchanger located at the beginning of the process, i.e. upstream of the reactor, in order to vaporize $SiCl_4$ and/or preheat the $H_2/SiCl_4$-containing feed mixture so as to save energy before the product mixture/gas steam is processed further or worked up. In this way, the feed gas stream and the product gas stream can advantageously be conveyed in countercurrent in order to preheat the feed gas and thus achieve particularly energy-efficient operation.

In the process of the invention, the reaction product, i.e. product mixture, obtained in this way can be worked up or processed further, preferably by (i) fractionating or at least partially condensing the product mixture in a manner known per se to give liquid, advantageously highly pure $HSiCl_3$ and recirculating any hydrogen and silicon tetrachloride obtained to the feed stream of the present process or (ii) passing the product stream as starting material to a direct further use, for example in an esterification with an alcohol to form alkoxysilanes, in a hydrosilylation process for converting olefins into organochlorosilanes, in the preparation of monosilane or solar silicon or in the preparation of pyrogenic silica.

In general, a defined mixture of hydrogen and silicon tetrachloride is prepared in order to carry out the process of the invention. A reactor which is resistant to silicon tetrachloride and HCl and relatively high temperatures and has metallic heating elements of a resistance heating device integrated into its reaction region is usually firstly baked and flushed with dry inert gas, for example argon, or with hydrogen. After electric power has been connected, the resistance heating device can be run up, set to the reaction temperature and supplied with the feed gas mixture of $H_2$ and $SiCl_4$. At the outflow end of the reactor, a product mixture which advantageously comprises $HSiCl_3$ up to the concentration corresponding to the thermodynamic equilibrium is obtained.

The present invention is illustrated by the following examples without the subject matter of the present invention being restricted thereby.

EXAMPLES

Example 1

In a fused silica reactor having a diameter of 15 mm and a length of 250 mm, a W wire having a diameter of 0.4 mm and a length of 400 mm in the form of a spiral is used as direct resistance heating device. This wire is heated to the reaction temperature of 800° C. by application of a voltage of from 10 to 11 V. The temperature of the wire is measured by means of a sheathed thermocouple. A $H_2/SiCl_4$ mixture flows through the reactor at a throughput of 7 l/h. The conversion in the reaction is monitored by gas chromatography. Table 1 shows the conversion of $SiCl_4$ into $HSiCl_3$ at various $H_2/SiCl4$ ratios.

TABLE 1

| $n(H_2)/n(SiCl_4)$ | Degree of conversion into $HSiCl_3$ (%) |
|---|---|
| 4 | 15.3 |
| 5.5 | 18.3 |
| 6 | 19.0 |

Example 2

The apparatus described in example 1 is used. The degrees of conversion are determined as a function of the flow rate at 800° C. and a constant $n(H_2)/n(SiCl_4)$ ratio of 6:1, cf. Table 2.

TABLE 2

| Volume flow at STP (l/h) | Degree of conversion into $HSiCl_3$ (%) |
|---|---|
| 7 | 19.0 |
| 10.5 | 17.6 |
| 14 | 16.7 |

Example 3

In a fused silica reactor having a diameter of 15 mm and a length of 250 mm, a W wire having a surface area of 5.6 cm² is used in the form of a spiral. This wire is heated to the reaction temperature of 900° C. by application of a voltage. A $H_2/SiCl_4$ mixture flows through the reactor at a throughput of 7 l/h. The conversion in the reaction is monitored by gas chromatography. Table 3 shows the conversion of $SiCl_4$ into $HSiCl_3$ at various $H_2/SiCl_4$ ratios.

TABLE 3

| $n(H_2)/n(SiCl_4)$ | Degree of conversion into $HSiCl_3$ (%) |
|---|---|
| 4 | 20.9 |
| 6 | 21.1 |

Example 4

The apparatus described in example 3 is used. It is operated at a constant molar $H_2/SiCl_4$ ratio of 6 and a throughput of 7 l/h. The electric power applied is increased from 65 W to 80

W. Within a few minutes, the degree of conversion has increased from 21.1 mol % to 23.4 mol %.

The invention claimed is:

1. A process for the catalytic hydrodehalogenation of $SiCl_4$ to form $HSiCl_3$, which comprises:
bringing a gaseous feed mixture comprising hydrogen and silicon tetrachloride into direct contact with at least one heating element of a resistance heating device in a reactor at a pressure of from 1 to 100 bar abs, wherein the heating element consists of at least one metal material selected from the group consisting of tungsten, niobium, tantalum, an alloy comprising tungsten, an alloy comprising niobium, and an alloy comprising tantalum, wherein the heating element is the only hydrodehalogenation catalyst present in the reactor; and
heating the gaseous feed mixture by contacting the gaseous feed mixture with the heating element to catalytically hydrodehalogenate the silicon tetrachloride with the hydrogen and form a product mixture comprising $HSiCl_3$; and
performing at least one of the following:
(a) fractionating or at least partially condensing the product mixture, and
(b) passing the product mixture from the heating as a starting material to a direct further use.

2. The process as claimed in claim 1, wherein said heating element consists of tungsten.

3. The process as claimed in claim 1, wherein the heating is carried out with at least one heating element in the form of at least one selected from the group consisting of a wire, a spiral, a web, a tube, a plate, a mesh and a honeycomb body.

4. The process as claimed in claim 1, wherein the heating is carried out with a heating element having a wire diameter, wall thickness, plate thickness or layer thickness of from 0.1 mm to 10 mm.

5. The process as claimed in claim 1, wherein the heating is carried out with the heating elements of the resistance heating device operated at a temperature in the range from 300 to 1250° C.

6. The process as claimed in claim 1, wherein the heating is carried out at a space velocity of from 2000 to 750,000 $h^{-1}$ and the gaseous feed mixture is contacted with the heating elements of the resistance heating device at a linear velocity of from 0.01 to 10 m/s.

7. The process as claimed in claim 6, wherein the feed mixture comprises $SiCl_4$ and $H_2$ in a molar ratio of from 1:0.9 to 1:20.

8. The process as claimed in claim 6, further comprising:
setting the electric power of the resistance heating device to set a degree of conversion of $SiCl_4$ to $HSiCl_3$.

9. The process as claimed in claim 1, wherein the heating is carried out in a flow reactor whose walls or wall insides are made from at least one selected from the group consisting of niobium, tungsten, tantalum, a niobium, tungsten, tantalum-containing alloy, a heat-resistant glass, fused silica, a heat-resistant glaze and a heat-resistant ceramic.

10. The process as claimed in claim 6, further comprising:
passing the product mixture through at least one heat exchanger to vaporize $SiCl_4$ and/or preheat the $H_2/SiCl_4$-containing feed mixture.

11. The process as claimed in claim 10, wherein the product mixture is at least partially condensed, liquid $HSiCl_3$ is isolated and any hydrogen and silicon tetrachloride obtained are recirculated to the feed stream to the process.

12. The process as claimed in claim 1, wherein said heating element consists of niobium.

13. The process as claimed in claim 1, wherein said heating element consists of tantalum.

14. The process as claimed in claim 1, wherein said heating element consists of an alloy comprising tungsten.

15. The process as claimed in claim 1, wherein said heating element consists of an alloy comprising niobium.

16. The process as claimed in claim 1, wherein said heating element consists of an alloy comprising tantalum.

17. The process of claim 1, wherein the gaseous feed mixture is contacted with the heating element and heated at a pressure of from 1 to 10 bar absolute.

18. The process of claim 1, wherein the gaseous feed mixture is contacted with the heating element and heated at a pressure of from 1.5 to 10 bar absolute.

19. The process of claim 1, wherein the process comprises heating the feed mixture at a temperature in the range from 600 to 950° C., and fractionating or at least partially condensing the product mixture.

20. The process as claimed in claim 1, comprising:
fractionating or at least partially condensing the product mixture to obtain a purified product consisting of $HSiCl_3$.

21. The process as claimed in claim 1, wherein the product mixture formed by the catalytic hydrodehalogenation comprises $HSiCl_3$ and HCl.

22. The process as claimed in claim 1, wherein the product mixture comprises HCl and $HSiCl_3$, and the product mixture is subjected to at least one of fractionating and at least partial condensation.

23. The process as claimed in claim 1, wherein the $HSiCl_3$ of the product mixture consists of $HSiCl_3$ formed by catalytically hydrodehalogenating the silicon tetrachloride.

24. The process as claimed in claim 1, wherein said heating element consists of tungsten or an alloy comprising tungsten.

25. The process as claimed in claim 1, wherein the gaseous feed mixture is contacted with the heating element at a temperature of 600-800° C.

26. A process for the catalytic hydrodehalogenation of $SiCl_4$ to form $HSiCl_3$, comprising:
feeding a gaseous mixture consisting of hydrogen and silicon tetrachloride into a reactor,
contacting, at a pressure of 1 to 100 bar abs, the gaseous feed mixture in the reactor with at least one heating element of a resistance heating device consisting of at least one metal material selected from the group consisting of tungsten, niobium, tantalum, an alloy comprising tungsten, an alloy comprising niobium, and an alloy comprising tantalum, wherein the heating element is the only hydrodehalogenation catalyst present in the reactor; and
catalytically hydrodehalogenating the silicon tetrachloride with the hydrogen on the heating element to form a product mixture comprising $HSiCl_3$; and then
carrying out at least one of (A) and (B):
(A) at least one of fractionating and at least partially condensing the product mixture, and
(B) passing the product mixture obtained from the heating to a further process as a starting material.

* * * * *